United States Patent [19]

Haines

[11] 4,126,714

[45] Nov. 21, 1978

[54] PROCESS FOR TREATING CHROMIUM DIOXIDE

[75] Inventor: Robert S. Haines, Boulder, Colo.

[73] Assignee: International Business Machines Corporation, Armonk, N.Y.

[21] Appl. No.: 811,922

[22] Filed: Jun. 30, 1977

Related U.S. Application Data

[63] Continuation of Ser. No. 638,795, Dec. 8, 1975, abandoned.

[51] Int. Cl.$^2$ ............................................. H01F 10/02
[52] U.S. Cl. .................................... 427/127; 427/215
[58] Field of Search ............................... 427/127–132, 427/215

[56] References Cited

U.S. PATENT DOCUMENTS

| | | | |
|---|---|---|---|
| 3,512,930 | 5/1970 | Bottjer | 427/128 X |
| 3,529,930 | 9/1970 | Bottjer | 423/607 X |
| 3,767,580 | 10/1973 | Kitamoto et al. | 423/607 X |

OTHER PUBLICATIONS

General Chemistry, pp. 674–675.

*Primary Examiner*—Bernard D. Pianalto
*Attorney, Agent, or Firm*—Carl O. Barth

[57] ABSTRACT

Ferromagnetic chromium dioxode is normally produced using other chromium compounds as starting materials. In most reactions a Cr(VI) compound, such as chromium trioxide is used in some stage of the procedure. Following the conversion reaction there are inevitably small amounts of the original chromium (VI) ions in the form of salts or oxide compounds which are strongly adsorbed on or attached to the chromium dioxide in a manner which prevents them from being easily removed by normal washing techniques. These Cr(VI) ions, if left in the chromium dioxide can cause problems. These disadvantages have now been overcome by treating the impure chromium dioxide with a peroxide compound in a manner which causes the Cr(VI) ions to change their character and allow their removal from the chromium dioxide.

18 Claims, No Drawings

PROCESS FOR TREATING CHROMIUM DIOXIDE

This is a continuation of application Ser. No. 638,795 filed Dec. 8, 1975 and now abandoned.

BACKGROUND OF THE INVENTION

1. Field of the Invention

This invention relates to ferromagnetic chromium dioxide compositions, to methods of improving ferromagnetic chromium dioxide particles, and to the resulting ferromagnetic chromium dioxide particles. Such particles are suitable for use, for example, in magnetic recording media.

2. Description of the Prior Art

The preparation of ferromagnetic chromium dioxide and the use of this material to make magnetic recording members has been described in a number of patents, among which may be mentioned U.S. Pat. Nos. 2,885,365; 2,923,683; 2,923,684, 2,923,685, 2,956,955; 3,080,319, 3,117,093 and 3,278,263. Chromium dioxide prepared as described in these references is reported as having good ferromagnetic properties. These references also report that magnetic recording media in which chromium dioxide particles are disposed are useful for the storage of information. The usefulness of any information storage media depends on its reliability which in turn depends on the certainty that all information stored can be retrieved on demand, even after long periods of storage. Therefore, in a magnetic storage system, it is required that the magnetic characteristics of the recording media remain essentially unchanged over a protracted time under both conventional and unconventional storage conditions.

Ferromagnetic chromium dioxide by itself in the form of a dry powder is stable and can be stored under dry conditions for years with no notable changes in its magnetic character. However, chromium dioxide has been noted to be effected by water and other materials, such as synthetic polymeric resins utilized in the preparation of magnetic media. Both water and resins react slowly with untreated chromium dioxide to convert the ferromagnetic chromium dioxide to nonmagnetic materials and to deteriorate any associated binder systems with the result that some of the desirable magnetic and physical characteristics of chromium dioxide recording media diminish with age.

In the above noted patent references most ferromagnetic chromium dioxide is prepared by conversion reactions which normally use chromium (VI) trioxide in some step of the procedure. Apparently, following such a reaction small amounts of Cr(VI) ions remain unreacted and become strongly adsorbed or attached on the chromium dioxide particles in such a manner that they cannot be easily completely removed by conventional washing techniques. Such Cr(VI) compounds have the characteristics of strong oxidizing agents and are apparently capable of effecting the chromium dioxide organic polymer binder systems in which the chromium dioxide may be dispersed to form a magnetic recording media. This deterioration reaction is accelerated in the presence of high humidity, high temperature, or both. Such deterioration effects both the magnetic reliability of the recording media and the physical continuity and strength of the recording media. Additionally such Cr(VI) compounds are capable of migrating to the surface of a magnetic recording media where they can cause deterioration, corrosion and wear of magnetic transport systems in which they are used, including the highly sensitive magnetic recording heads.

Early efforts to avoid this problem relied only on washing the chromium dioxide, but such treatment was incapable of easily totally removing all of the Cr(VI) compounds. The first published patent recognition and proposed solution of this problem is believed to have appeared in U.S. Pat. No. 3,512,930. In this reference it was noted that chromium dioxide tended to be "unstable" and a method of stabilizing it by treatment with a reducing agent, for example, sodium bisulfite, was taught. Subsequently, a large number of patents have been devoted to techniques of treating chromium dioxide, coating chromium dioxide, or adding additives to magnetic media compositions containing chromium dioxide in order to "stabilize" the chromium dioxide or the media. These include U.S. Pat. Nos. 3,558,492; 3,585,141; 3,586,630; 3,634,252; 3,649,541; 3,686,031; 3,687,726; 3,736,181; 3,767,580; 3,769,087; 3,801,510; 3,819,411; 3,840,400 and 3,841,907. Of these "stabilizing" references, U.S. Pat. Nos. 3,512,930 and 3,767,580 may be of greatest interest to the present invention. As described in more detail below, the solution for the removal of Cr(VI) taught by the present invention is the treatment of chromium dioxide with a peroxide compound. Peroxide compounds are normally considered to be strong oxidizing agents. However, in the practice of the present invention it is not known with certainty whether the oxidizing character of the peroxides or some other characteristic of the peroxides is responsible for the beneficial effects. An oxidizing reaction seems unlikely in view of the initial highly oxidized state of the Cr(VI) ions. Interestingly U.S. Pat. No. 3,512,930 suggests treatment of chromium dioxide with reducing agents to stabilize it. The effect of a reducing agent is normally totally opposite to that of an oxidizing agent. U.S. Pat. No. 3,767,580 is of interest as defining the stabilization problem in terms which are similar to those which are understood to exist in the theory of the present application. However, in U.S. Pat. No. 3,767,580 the solution to the problem is obtained not by changing or removing the Cr(VI) ions, but by the reaction of the chromium ions with compounds which form water insoluble chromium compounds. This solution tends to destroy the mobility of the Cr(VI) ions rather than to provide means for removing them from the chromium dioxide. Of additional interest to the present invention is U.S. Pat. No. 3,529,930 which discloses a method of improving, rather than stabilizing, chromium dioxide by heating it in the presence of a gaseous oxidizing agent. The reference is of interest for comparison with the process of the present invention since, as already noted, peroxides are normally considered to be oxidizing agents. However, as also already noted, it is believed that in the present reaction no substantial oxidizing reaction takes place, but even if one did take place the processing procedure of the present invention, as described in more detail below is substantially different and patentably distinct from that taught by U.S. Pat. No. 3,529,930.

SUMMARY OF THE INVENTION

It is therefore an object of the present invention to provide a process for treating chromium dioxide paticles having Cr(VI) compounds as associated impurities with a peroxide compound in such a manner that substantially all Cr(VI) ions can be eliminated from the chromium dioxide.

The present invention provides chromium dioxide compounds from which Cr(VI) impurities have been eliminated by treating chromium dioxide compounds containing Cr(VI) impurites with a peroxide compound. The peroxide compound may be either inorganic or organic. Where the peroxide compound is liquid under ambient conditions it can be applied directly to the to-be-treated chromium dioxide or diluted with a suitable solvent. Where the peroxide compound is normally solid under ambient conditions it can be dissolved in a suitable solvent prior to its application to the to-be-treated chromium dioxide. While water or organic solvents may be utilized to dissolve or dilute the peroxide compounds, in preferred embodiments nonaqueous solvent systems are utilized. While water can be utilized it is not preferred as it tends to dissolve and hold Cr(VI) compounds and to make their subsequent treatment and removal from chromium dioxide somewhat more complicated. The effective concentration range of the peroxide compounds with respect to the to-be-treated chromium dioxide is quite broad. As little as 1%, by weight, based upon the weight of the to-be-treated chromium dioxide is noted to have a beneficial effect. Amounts in the range of about 5% to about 50%, by weight, of the to-be-treated chromium dioxide are preferred, while about 10% to about 15% have been found to be beneficial for removing substantially all traces of Cr(VI) from chromium dioxide. Amounts of peroxide compounds in excess of 50%, by weight, of the to-be-treated chromium dioxide may be utilized, but have no apparent addition beneficial effect.

As already noted, it is believed that substantially any peroxide compound is suitable for use in the practice of the present invention. Hydrogen peroxide and alkali metal and alkaline earth metal peroxides are suitable for use. Any of the organic peroxides are suitable in the practice of the present invention and in many instances are preferred due to their excellent solubility in nonaqueous solvents. Many examples of suitable peroxide compounds are set forth below in the preferred embodiments.

The temperature and time of treatment of chromium dioxide containing Cr(VI) with peroxide compounds are, not surprisingly, related. The benefical results of the present invention are obtained under room temperature conditions in a relatively short time, and it is believed that the beneficial reaction may be carried out at even lower temperatures. In practice, a practical range of reaction temperatures for the treatment of chromium dioxide with peroxide compounds is in the range of about 15° C. to about 220° C. The temperature of 220° C. is primarily limiting in terms of the side reactions which peroxide compounds begin to experience above this temperature and is not known to be limiting on the benefical effects of the present invention. The preferred practical temperature range is about 60° C. to 120° C., with many reactions beneficially being carried out at about 90° C. Time of reaction varies from about 5 minutes to 90 hours, with the time required clearly being a function of both the temperature of the reaction mixture and the concentration of the peroxide compound. In most instances reactions are carried out for from about 1 to about 10 hours with about 5 hours normally being sufficient to complete most reactions. There are definite benefits in utilizing a relatively low temperature, below about 120° C. for relatively long periods of time. Experience has shown that utilizing too high a temperature can sometimes lead to the formation of unwanted chromium compounds in the solution. Additionally, due to what appears to be the highly adsorbed nature of the Cr(VI) within the chromium dioxide it becmes important to retain substantial amounts of the peroxide compounds in undecomposed form for a substantial period of time so that it is available to react with the Cr(VI) ions as they become available in solution. Peroxide compounds decompose more slowly at lower temperatures.

If desired, mixtures of peroxide compounds may be used in the process of this invention. The addition of other ingredients to the reaction mixture, which other ingredients do not interfere with the reaction desired is contemplated to be within the scope of this invention.

After the Cr(VI) containing chromium dioxide is treated with chromium containing compounds it may be utilized, as is, or treated with a suitable solvent to extract the soluble chromium and organic by-products. In any event, the resulting chromium dioxide is found to be free of detrimental Cr(VI) compounds, and when added to a binder to form a magnetic media, does not undergo changes in either magnetic or physical characteristics.

While the theory of the present invention is not understood with certainty, certain ideas concerning its mechanism have been developed. As discussed above, it is theorized that minor amounts of Cr(VI) ions are present within the chromium dioxide structure. These ions are capable of reacting with water or binders when the chromium dioxide is subsequently placed in a humid atmosphere or in a binder composition, for example to form magnetic recording media. The combination of Cr(VI) ions with water or binder constituents has a tendency to cause the magnetic moment of the composition to be decreased. This effects the recording characteristics of the media after it is made.

When a chromium dioxide composition, including Cr(VI) impurities is treated with a peroxide compound it is theorized that a complex, perhaps in the form of $CrO(O_2)_2$, is formed in which the chromium maintains its $+6$ valence. Subsequently, when this complex is subjected to destabilizing conditions, such as ambient conditions or mild heating, the complex is believed to deteriorate to chromium at a lower valence state, which lower valence chromium has little tendency to react with water or binders and which does not exhibit the properties of a strong oxidizing agent in the same manner as Cr(VI). During the same decomposition reaction it is believed that the oxygen which had been combined with the Cr(VI) complex is oxidized to the neutral state and evolved as a gas. However this is only a theory and has not been rigorously determined.

The presence of a strong oxidizing agent such as Cr(VI) is unstabilized chromium dioxide has been proven, for example, by the oxidation of organic compounds containing unstabilized chromium dioxide. So, for example, Estane 5703, a commercial polyester urethane supplied by B. F. Goodrich Chemical Co., when mixed with unstabilized chromium dioxide and then tested by infrared analysis shows the characteristics of oxidation to cyclic aromatic compounds by providing new infrared absorbtion bands at 930, 860 and 770 $cm^{-1}$. By contrast, chromium dioxide which has been stabilized in accordance with the present invention does not oxidize Estane 5703 in this manner. Therefore, it is apparent that there is a strong oxidizing agent present in the untreated chromium dioxide, which oxidizing agent is removed by the stabilization treatment of the present invention.

Further evidence of the presence of Cr(VI) in the unstabilized compound is that when unstabilized chromium dioxide is treated with water a yellow solution, characteristic of Cr(VI), is formed. Chemical analysis of such solutions for Cr(VI) has clearly identified it as being present in this solution as has the use of an S 800 Chromium 6 electrode from Sensorex, Co. which provides a specific Cr(VI) test. Chromium dioxide which has been stabilized by the method of the present invention does not show the characteristic yellow color of Cr(VI) when treated with water in the same manner and does not give evidence of Cr(VI) when tested chemically or with the S 800 Chromium 6 electrode.

The foregoing and other objects, features, and advantages of the invention will be apparent from the following more particular description of the preferred embodiments of the invention.

DESCRIPTION OF THE PREFERRED EMBODIMENTS

In the following examples, most reactants and solvents were reagent grade chemicals; however, use of commercial grade chemicals is within the scope of this invention. Ferromagnetic chromium dioxide utilized in the method of the present invention was obtained as "unstabilized" chromium dioxide from E. I. du Pont de Nemours Company, Inc. and is believed to have been produced in accordance with the processes of one or more of the previously noted patents, and more specifically in accordance with the teaching of U.S. Pat. No. 3,278,263. When analyzed the unstabilized chromium dioxide was found to have an average length of about 0.4 micron with widths in the range of 0.025 to 0.04 micron wide, thus having an acicular ratio in the range of 10:1 to 15:1. The intrinsic coercivity of the particles was found to vary in the range of about 495 to 570 oersteds, while the magnetic moment ranged from about 70 to 85 emu/g. The material was found to include, on the average, about 60-14 61% chromium, 0.05% antimony and 0.10% iron. Magnetic measurements were made with a vibrating sample magnetometer at 4000 oersteds. Determination of the chemical content of the particles was obtained by both X-ray fluorescence spectroscopy and infra-red analysis. Particle shape, size and length-to-width ratios were determined from electron micrographs of the particles. The presence of Cr(VI) was normally determined by the use of the specific S 800 Chromium 6 electrode provided by Sensorex, Co.

EXAMPLE I

A 46 g sample of chromium dioxide, $CrO_2$, purchased from E. I. du Pont de Nemours, Inc. and represented as being "unstabilized" was obtained. This sample was heated for about 12 hours at a temperature of 220° C. in air and under atmospheric pressure to dry it. Drying was carried out in order to lower the moisture content before further treatment. When dry the sample exhibited a magnetic moment of 82 emu/g and an intrinsic coercivity of 556 oersteds. Subsequently, the dry sample was mixed with 46 g of a solution of 10% dicumyl peroxide in methyl ethyl ketone (MEK). Dicumyl peroxide is believed to have a structure of $C_6H_5-C(CH_3)_2-CO-O_2-CO-C(CH_3)_2-C_6H_5$. This mixture of $CrO_2$ and dicumyl peroxide in MEK was placed in a shaking device for about 16 hours. Subsequently, the mixture was removed from the shaker and the MEK allowed to evaporate under ambient conditions. The resulting treated chromium dioxide particles had no visible formation of dicumyl peroxide crystals on their surface. This suggests that the dicumyl peroxide was completely adsorbed in the $CrO_2$ as dicumyl peroxide is normally identifiable as a white crystal when crystallized from solution. Next the chromium dioxide with adsorbed dicumyl peroxide was heated for about 20 hours at 116° C. in an air oven under atmospheric pressure. The composition was then washed and extracted by treatment with methylene dichloride. This extraction solution when analyzed, was found to include diphenyl carbonate, which compound is believed to be the reaction or decomposition product resulting from the reaction of dicumyl peroxide with chromium dioxide. The extracted chromium dioxide was then dried in a vacuum oven for 2 hours at 40° C. It was found to have a magnetic moment of 68 emu/g and a coercivity of 584 oersteds.

When 0.1 g of the dicumyl peroxide treated $CrO_2$ was added to 10 cc. of water and boiled for an hour no traces of chromate ion (Cr VI) were observed visibly or by use of the S 800 electrode. When a similar sample of the original unstabilized $CrO_2$ is treated with water in a similar manner the resulting solution is yellow in color and found to contain Cr(VI) ions using the S 800 electrode. Thus, it is seen that the peroxide treatment of unstabilized $CrO_2$ results in the removal of water soluble Cr(VI) ions from the $CrO_2$.

EXAMPLE II

A 46 g sample of "unstabilized" chromium dioxide purchased from E. I. du Pont de Nemours, Inc. was obtained. This sample was heated for about 12 hours at a temperature of 220° C. in air and under atmospheric pressure to dry it. When dry the sample exhibited a magnetic moment of 82 emu and an intrinsic coercivity of 556 oersteds. Subsequently, the dry sample was mixed with 46 g of a solution of 10% dicumyl peroxide in MEK. This mixture of $CrO_2$ and dicumyl peroxide in MEK was placed in a shaking device for about 2 hours. Subsequently, the mixture was removed from the shaker and the MEK allowed to evaporate under ambient conditions. The resulting treated chromium dioxide particles had no visible formation of dicumyl peroxide crystals on their surface. Next the chromium dioxide with adsorbed dicumyl peroxide was heated for about 60 hours at about 90° C. in an air oven under atmospheric pressure. The composition was then washed and extracted three times by treatment with methylene dichloride. This extraction solution when analyzed, was found to include diphenyl carbonate. The extracted chromium dioxide was then dried in a vacuum over for 2 hours at 40° C. It was found to have a magnetic moment of 67 emu/g and a coercivity of 584 oersteds. No traces of Cr(VI) could be detected.

It is thus noted that the process of the present invention, even when varied, is highly reproducible.

EXAMPLE III

A 46 g sample of the same chromium dioxide utilized in Example I and II was dried. When dry the sample exhibited a magnetic moment of 82 emu and an intrinsic coercivity of 556 oersteds. Subsequently, the dry sample was mixed with 46 g of a solution of 10% dibenzoyl peroxide in methyl ethyl ketone (MEK). Dibenzoyl peroxide is believed to have a structure of $C_6H_5-CO-O_2-CO-C_6H_5$. This mixture of $CrO_2$ and dibenzoyl peroxide in MEK was placed in a shaking device for about 16 hours. Subsequently, the mixture was removed from the shaker and the MEK allowed to evaporate under ambient conditions. The resulting treated chromium dioxide particles had visible crystals on their surface. This suggests that the dibenzoyl peroxide was not completely adsorbed in the $CrO_2$. Next the chromium dioxide treated with dibenzoyl peroxide was heated for about 4 hours at 116° C. in an air oven under atmospheric pressure. The composition was then washed and extracted by treatment with methylene dichloride. The extracted chromium dioxide was then dried in vacuum oven for two hours at 40° C. It was found to have a magnetic moment of 73 emu/g and a coercivity of 558 oersteds.

When 0.1 g of the peroxide treated $CrO_2$ was added to water and boiled for an hour no traces of chromate ion (CrVI) were observed visibly or by the use of the S 800 electrode.

EXAMPLE IV

A 2 g sample of the same unstabilized chromium dioxide used in the previous Examples was obtained and dried. When dry the sample exhibited a magnetic moment of 82 emu and an intrinsic coercivity of 556 oersteds. Subsequently, the dry sample was mixed with 12 g of 30% hydrogen peroxide (aqueous) and 70 g paradioxane. Hydrogen peroxide is believed to have a structure of $H_2O_2$. The para-dioxane and water were allowed to evaporate under ambient conditions. The resulting treated chromium dioxide particles had no visible formation of crystals on their surface. This was then washed twice with para-dioxane and once with methylene dichloride. Next the chromium dioxide treated with hydrogen peroxide was heated for about one-half hour at 116° C. in an air oven under atmospheric pressure. The resulting chromium dioxide was not extracted and was found to have a magnetic moment of 74 emu/g and a coercivity of 577 oersteds.

When 0.1 g of the peroxide treated $CrO_2$ was added to water and boiled for one-half hour no traces of chromate ion (CrVI) were observed visibly or by use of the S 800 electrode.

EXAMPLE V

A 25 g sample of chromium dioxide obtained from E. I. du Pont de Nemours and Company, Inc., as unstabilized chromium dioxide was coated with Fluorel elastomer fully-saturated fluorinated polymer supplied by 3M Co. The Fluorel was coated from a 10% solution utilizing methyl ethyl ketone as the solvent. Following this treatment the chromium dioxide particles were thinly coated with the polymer but retained their individual particle character. When measured for magnetic properties they were found to have a magnetic moment of 81 emu/g and a coercivity of 552 oersteds.

Five grams of these polymer coated particles were the mixed with 7.5 g of 6.25% dilauryl peroxide in MEK. Dilauryl peroxide is believed to have a structure of $CH_3(CH_2)_{10}-CO-O_2-CO-(CH_2)_{10}CH_3$. This mixture was placed in a bottle and mixed on a roller mill for one-half hour. Subsequently, the mixture was removed from the bottle and the MEK allowed to evaporate under ambient conditions. During the roller milling the Fluorel polymer coating was not found to be removed from the chromium dioxide particles.

Next the chromium dioxide particles coated with polymer and treated with dilauryl peroxide was heated for about 15 minutes at about 110° C. in an air oven under atmospheric pressure. The composition was then washed and extracted with methylene dichloride. When dried the powder was found to exhibit a magnetic moment of 71 emu/g and a coercivity of 567 oersteds.

When 0.1 g of the thus polymer coated treated chromium dioxide was added to water and boiled for one hour no trace of Cr(VI) ions were observed. When a similar sample of Fluorel polymer coated unstabilized $CrO_2$ is treated with water in a similar manner the resulting solution is yellow in color and found to contain Cr(VI) ions. Thus, it is seen that the presence of a polymer coating on the chromium dioxide does not prevent the Cr(VI) ion from either being treated in accordance with the present invention or from migrating through the polymer coating.

EXAMPLE VI

A sample of 3.5 g of polymer coated chromium dioxide prepared as in Example V and having the same initial magnetic properties was mixed with 0.5 g of 70% t-butylhydroperoxide and 5 g of methylene dichloride in a bottle and mixed on a roll mill for 15 minutes. It is believed that t-butylhydroperoxide has a structure of $CH_3C(DH_3)_2-O_2-H$. The resulting mixture was removed from the bottle and the methylene dichloride allowed to evaporate under ambient conditions. The resulting dry mixture was then heated at about 130° C. for about 30 minutes in an air oven under atmospheric pressure. When dried it was found to have a magnetic moment of 70 emu/g and a coercivity of 567 oersteds.

When 0.1 g of the peroxide treated $CrO_2$ was added to water and boiled for one hour no trace of Cr(VI) ion was observed.

EXAMPLE VII

A large sample of chromium dioxide was prepared in accordance with the technique set forth in Example III by treatment with dibenzoyl peroxide. Subsequently, 21 g of this chromium dioxide was mixed with 40 g of para-dioxane and placed in a shaker for two hours. Than 45 g of polyester urethane sold commercially as Estane 5703 in the form of a 10% solution dissolved in para-dioxane was added to the mixture. Shaking of the chromium dioxide, polymer and solvent was then carried out for one hour. Then 0.4 g of Mondur-MRS polymethylene, polyphenyl isocyanate, supplied by Mobay, Company was added to the mixture as a crosslinker. The resulting ink was then knife coated on a 1.5 mil thick polyester substrate, dried, calendered and then cured for 48 hours at 60° C. The resulting tape was found to serve as an excellent magnetic recording media.

Excellent recording media was also prepared from chromium dioxide prepared in accordance with the process set forth in Example I.

Uses for the materials produced in the foregoing examples are well known. As detailed in Example VII, above, the Cr(VI) free ferromagnetic $CrO_2$ compositions produced by the examples may be mixed with non-magnetic, organic, film-forming binders and utilized to prepare magnetic recording media. The resulting media is free of Cr(VI) contamination from the chromium dioxide and thus avoids this source of magnetic and physical deterioration.

Typical, but not limiting, binders for use singularly or in combination for preparing various recording media, including ferromagnetic particles produced in accordance with this invention, are polyesters, cellulose esters and ethers, epoxides, vinyl chloride, vinyl acetate, acrylate and styrene polymers and copolymers, polyurethanes, including polyester and polyether urethanes, polyamides, aromatic polycarbonates, and polyphenyl ethers.

A wide variety of solvents may be used for forming a dispersion of the fine ferromagnetic particles treated as in the foregoing examples with various binders. Organic solvents used singularly or in combination, such as ethyl, butyl, and amyl acetate, isopropyl alcohol, dioxane, para-dioxane, acetone, methylisobutyl ketone, methyl ethyl ketone, cyclohexanone, tetrahydrofuran and toluene are useful for this purpose. The particlebinder dispersion may be applied to a suitable substrate by roller coating, gravure coating, knife coating, extrusion, or spraying of the mixture onto the backing, or by other known methods.

In preparing recording media, the magnetic particles usually comprise about 40-90%, by weight, of the solids in the film layer applied to the substrate. The substrate is usually a flexible resin, such as polyester or cellulose acetate material, although other flexible materials as well as rigid base materials are more suitable for some uses.

The specific choice of non-magnetic substrate binder, solvent or method of application of the magnetic composition to the support will vary with the properties desired and the specific form of the magnetic recording medium being produced.

While the invention has been particularly shown and described with reference to preferred embodiment thereof, it will be understood by those skilled in the art that various changes in form and details may be made therein without departing from the spirit and scope of the invention.

What is claimed is:

1. A process for treating ferromagnetic chromium dioxide having detrimental chromium trioxide adsorbed or attached to its surface, including the steps of:
   providing chromium dioxide essentially free of water,
   treating said chromium dioxide with a peroxide compound in a nonacqueous solution of a first solvent to convert the chromium trioxide to a reaction product,
   removing said first solvent,
   heating the resulting chromium dioxide to convert said reaction product to a resulting product, at least one component of which is soluble in a nonacqueous second solvent, and
   treating the resulting chromium dioxide with said second solvent to remove said soluble component.

2. The process of claim 1 in which said first solvent is different from said second solvent.

3. The process of claim 1 in which the amount of peroxide compound and the time and temperature of the treatment are sufficient to react or remove substantially all of the detrimental chromium trioxide.

4. The process of claim 3 in which the amount of peroxide is at least 10%, by weight, of the chromium dioxide to be treated, the time of treatment is at least 5 minutes, and the temperature of treatment is in the range of about 15° C. to about 220° C.

5. The process of claim 4 in which the amount of peroxide compound is in the range of about 10% to about 15%, by weight, of the chromium dioxide to be treated, the time of treatment is about 5 hours and the temperature of treatment is about 90° C.

6. The process of claim 1 in which said peroxide compound is selected from the group consisting of dicumyl peroxide, dilauryl peroxide, dibenzoyl peroxide, t-butylhydroperoxide and hydrogen peroxide.

7. Ferromagnetic chromium dioxide particles treated in accordance with the process of claim 1.

8. A ferromagnetic chromium dioxide composition comprising particles of ferromagnetic chromium dioxide treated in accordane with the process of claim 1, said particles being dispersed in a binder including synthetic organic resin.

9. A magnetic recording member comprising a support bearing a layer containing ferromagnetic chromium dioxide particles treated in accordance with the process of claim 1.

10. A process for producing ferromagnetic chromium dioxide comprising thermally decomposing a chromium compound at high temperatures and under pressure to produce ferromagnetic chromium dioxide having detrimental chromium trioxide adsorbed or attached to its surface, including the steps of:
    providing chromium dioxide essentially free of water,
    treating said chromium dioxide with a peroxide compound in a nonacqueous solution of a first solvent to convert the chromium trioxide to a reaction product,
    removing said first solvent,
    heating the resulting chromium dioxide to convert said reaction product to a resulting product, at least one component of which is soluble in a nonacqueous second solvent, and
    treating the resulting chromium dioxide with said second solvent to remove said soluble component.

11. A process for treating ferromagnetic chromium dioxide having detrimental chromium trioxide adsorbed or attached to its surface, including the steps of:
    providing chromium dioxide essentially free of water,
    treating said chromium dioxide with a peroxide compound in a nonacqueous solution of a solvent to convert the chromium trioxide to a reaction product,
    removing said solvent, and
    heating the resulting chromium dioxide to convert said reaction product to a resulting product no more detrimental to the properties of the chromium dioxide.

12. The process of claim 11 in which the amount of peroxide compound and the time and temperature of the treatment are sufficient to react substantially all of the detrimental chromium trioxide.

13. The process of claim 12 in which the amount of peroxide is at least 10%, by weight, of the chromium dioxide to be treated, the time of treatment is at least 5 minutes, and the temperature of treatment is in the range of about 15° C. to about 220° C.

14. The process of claim 11 in which the peroxide is selected from the group consisting of dicumyl peroxide, dilauryl peroxide, dibenzoyl peroxide, t-butylhydroperoxide and hydrogen peroxide.

15. Ferromagnetic chromium dioxide particles treated in accordance with the process of claim 11.

16. A ferromagnetic chromium dioxide composition comprising particles of ferromagnetic chromium dioxide treated in accordance with the process of claim 11, said particles being dispersed in a binder including synthetic organic resin.

17. A magnetic recording member comprising a support bearing a layer containing ferromagnetic chromium dioxide particles treated in accordance with the process of claim 11.

18. A process for producing ferromagnetic chromium dioxide comprising thermally decomposing a chromium compound at high temperatures and under pressure to produce ferromagnetic chromium dioxide having detrimental chromium trioxide adsorbed or attached to its surface, including the steps of:

providing chromium dioxide essentially free of water, treating said chormium dioxide with a peroxide compound in a nonacqueous solution of a solvent to convert the chromium trioxide to a reaction product, removing said solvent, and heating the resulting chromium dioxide to convert said reaction product to a resulting product no more detrimental to the properties of the chromium dioxide.

* * * * *